(12) United States Patent
Dumais

(10) Patent No.: US 9,709,738 B1
(45) Date of Patent: Jul. 18, 2017

(54) WAVEGUIDE CROSSING

(71) Applicant: Patrick Dumais, Ottawa (CA)

(72) Inventor: Patrick Dumais, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/067,443

(22) Filed: Mar. 11, 2016

(51) Int. Cl.
    *G02B 6/125* (2006.01)
    *G02B 6/122* (2006.01)
    *G02B 6/14* (2006.01)

(52) U.S. Cl.
    CPC ........... *G02B 6/125* (2013.01); *G02B 6/1228* (2013.01); *G02B 6/14* (2013.01)

(58) Field of Classification Search
    None
    See application file for complete search history.

(56) References Cited

U.S. PATENT DOCUMENTS

2005/0036737 A1* 2/2005 Stuart .................... G02B 6/122 385/28
2006/0133716 A1   6/2006 Little

FOREIGN PATENT DOCUMENTS

| CN | 1370283 A | 9/2002 |
|---|---|---|
| CN | 102749676 A | 10/2012 |
| EP | 2204679 A2 * | 7/2010 |

OTHER PUBLICATIONS

P. Sanchis et al. Highly efficient crossing structure for silicon-on-insulator waveguides. Optics Letters, 34:18:2760-2762, Sep. 15, 2009.*
H. Xu et al. Dual-mode waveguide crossing utilizing taper-assisted multimode-interference couplers. Optics Letters, 41:22:5381-5384, Nov. 15, 2016.*
Ma, Yangjin, et al., "Ultralow loss single layer submicron silicon waveguide crossing for SOI optical interconnect," Optics Express, vol. 21, No. 24, pp. 29374-29382.
Bogaerts, Wim, et al., "Low-loss, low-cross-talk crossings for silicon-on-insulator nanophotonic waveguides," Optics Letters, vol. 32, No. 19, pp. 2801-2803, 2007.

(Continued)

*Primary Examiner* — Mike Stahl
(74) *Attorney, Agent, or Firm* — Gowling WLG (Canada) LLP

(57) ABSTRACT

A waveguide crossing includes a first waveguide and a second waveguide intersecting the first waveguide such that a gap equal to a width of the second waveguide is formed in the first waveguide, the second waveguide having a centerline defining a plane of symmetry. The first waveguide has a first waveguide section through which a single optical mode propagates, followed by a first non-adiabatic diverging taper, followed by a second waveguide section wider than the first waveguide section through which two even-order optical modes propagate, followed by a second non-adiabatic diverging taper, followed by a third waveguide section wider than the second waveguide section through which three even-order optical modes propagate. The three even-order modes synthesize to form a quasi-Gaussian beam that self-replicates symmetrically across the gap, thereby providing a low-loss waveguide crossing useful for photonic switching.

15 Claims, 10 Drawing Sheets

(56) References Cited

OTHER PUBLICATIONS

Chen, Chyong-Hua, et al. "Taper-integrated Multimode-Interference based Waveguide Crossing Design," IEEE Journal of Quantum Electronics, vol. 46, No. 11, pp. 1656-1661, 2010.

Chen, Chyong-Hua, "Waveguide Crossings by Use of Multimode Tapered Structures," 21st Annual Wireless and Optical Communications Conference (WOCC), pp. 130-131, 2012.

Liu, Yangyang, et al., "Ultra-low-loss Waveguide Crossing Arrays Based on Imaginary Coupling of Multimode Bloch Naves," Advanced Photonics Congress, 2013.

Luo, Ying, et al., "Low-loss low-crosstalk silicon rib waveguide crossing with tapered multimode-interference design," The 9th International Conference on Group IV Photonics (GFP), pp. 150-152, 2012.

Shinobu, F., et al, "Low-loss simple waveguide intersection in silicon photonics," Electronics Letters, vol. 46, No. 16, 2010.

Stuart, Howard R., "Waveguide lenses with multimode interference for low-loss slab propagation," Optics Letters, vol. 28, No. 22, pp. 2141-2143, 2003.

Zhang, Yi, et al., "A CMOS-Compatible, Low-Loss, and Low-Crosstalk Silicon Waveguide Crossing," IEEE Photonics Technology Letters, vol. 25, No. 5, pp. 422-425, 2013.

Bock, Przemek J., et al., "Subwavelength grating crossings for silicon wire waveguides," Optics Express, vol. 18, No. 15, pp. 16146-16155, 2010.

Popović, Miloš A., "Low-Loss Bloch Waves in Open Structures and Highly Compact, Efficient Si Waveguide-Crossing Arrays," IEEE, pp. 56-57, 2007.

Sanchis, Pablo, et al., "Highly efficient crossing structure for silicon-on-insulator waveguides," Optics Letters, vol. 34, No. 18, pp. 2760-2762, 2009.

Chiu, Chia-Hsiang, et al., "Taper-integrated multimode-interference based crossings for silicon wire waveguides," Proceedings of SPIE, vol. 7606, pp. 2-7, 2010.

International Search Report of PCT/CN2016/078468 dated Feb. 6, 2017.

\* cited by examiner

WAVEGUIDE CROSSING

TECHNICAL FIELD

The present disclosure relates generally to optical waveguides and, more particularly, to optical waveguide crossings.

BACKGROUND

Silicon photonics is an emerging technology that enables fabrication of fast, low-cost and high-density photonic devices for a variety of uses and applications, notably in relation to optical network switching. Photonic switch fabrics, which are capable of switching optical signals without conversion to the digital domain, are an area of particular interest, especially for applications such as all-optical networks, data centers and optical interconnects.

A silicon photonic switch typically incorporates a number of optical waveguides of varying lengths, multiple optical switch cells, and multiple waveguide crossings having intersecting waveguides. A large switch matrix requires a large number of waveguide crossings. Achieving low optical loss and crosstalk due to waveguide crossings becomes particularly important for a large switch matrix. With silicon photonic components, the switch port count size may become limited by the total insertion loss and optical crosstalk. Low-loss, low-crosstalk waveguide crossings that can be fabricated using CMOS-compatible processes would thus be highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general, the present specification discloses a low-loss waveguide crossing. The waveguide crossing may be a silicon photonic waveguide crossing.

One inventive aspect of the disclosure is a waveguide crossing, e.g. a silicon photonic waveguide crossing, that includes a first waveguide and a second waveguide intersecting the first waveguide such that a gap equal to a width of the second waveguide is formed in the first waveguide. The first waveguide comprises a first waveguide section through which a single optical mode propagates, followed by a first non-adiabatic diverging taper, followed by a second waveguide section wider than the first waveguide section through which two even-order optical modes propagate, followed by a second non-adiabatic diverging taper, followed by a third waveguide section wider than the second waveguide section through which three even-order optical modes propagate. The first waveguide further comprises, downstream of the gap, a fourth waveguide section, followed by a first non-adiabatic converging taper, followed by a fifth waveguide section narrower than the fourth waveguide section, followed by a second non-adiabatic converging taper, followed by a sixth section narrower than the fifth waveguide section. In one implementation, the fourth, fifth and sixth waveguide sections are symmetrical with respect to a plane of symmetry defined by a center line of the second waveguide to the third, second and first waveguide sections, respectively, and wherein the first and second converging non-adiabatic tapers are symmetrical to the second and first diverging non-adiabatic tapers, respectively.

Another inventive aspect of the disclosure is a method of propagating light across a waveguide crossing, e.g. a silicon waveguide crossing, having a first waveguide intersecting a second waveguide such that a gap equal to a width of the second waveguide is formed in the first waveguide. The method entails propagating light having a single optical mode through a first waveguide section of the first waveguide, transforming the light through a first non-adiabatic diverging taper from the single optical mode to two even-order optical modes, propagating the light having the two even-order optical modes through a second waveguide section wider than the first waveguide section, transforming the light through a second non-adiabatic diverging taper from the two even-order optical modes to three even-order optical modes, and propagating the light through a third waveguide section wider than the second waveguide section to the gap where the three modes interfere to form a beam profile that self-replicates across the gap.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

In general, what is disclosed in this specification is a low-loss waveguide crossing such as, for example, a silicon waveguide crossing.

For the purposes of this specification, an adiabatic transition means that optical power propagating in a given mode before the transition will undergo a lossless transition into a single mode after the transition, whereas a non-adiabatic transition will result in transferring some optical power from a single given mode before the transition to two or more modes after the transition, e.g. from a fundamental mode to a first even order mode or from the first even order mode to a second even order mode. For greater clarity, the term "adiabatic" shall be understood as describing the lossless modal transition between one mode and another mode, and without transfer of power to additional modes.

Figure 1:
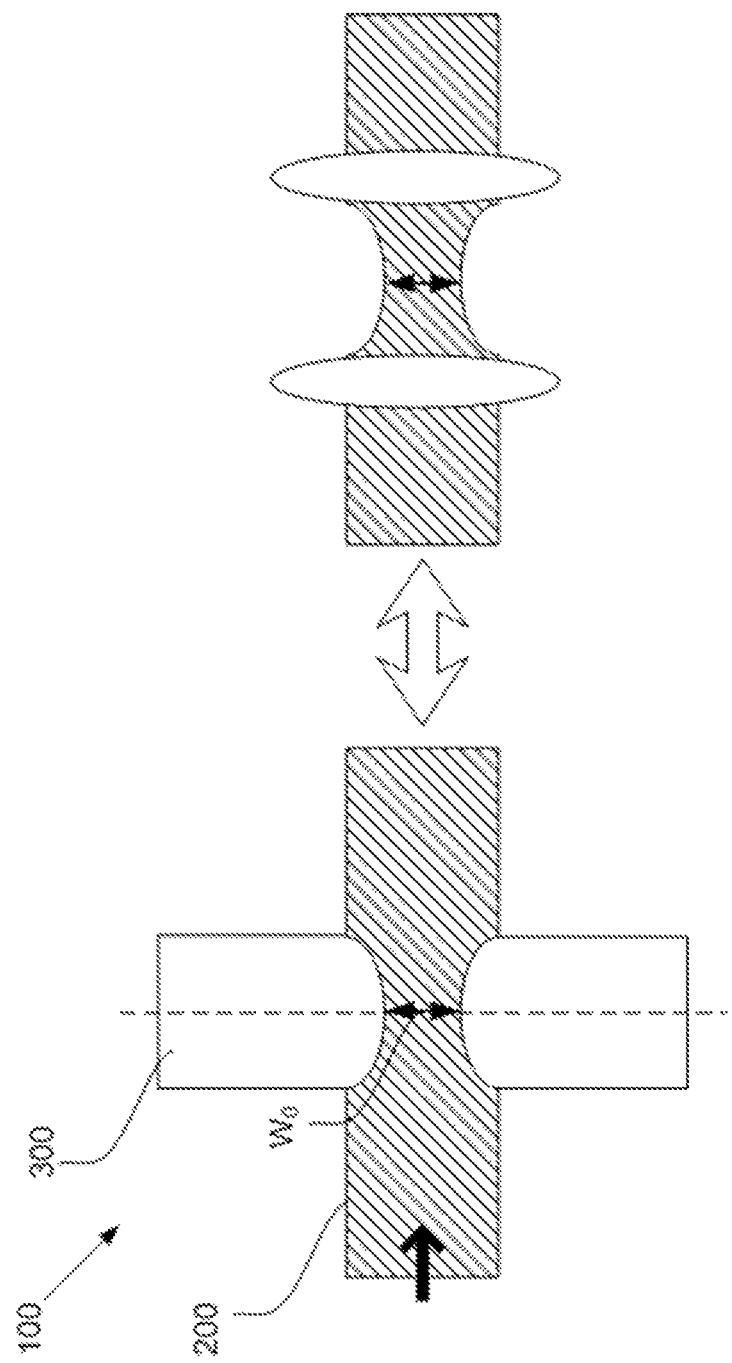
FIG. 1 illustrates self-replication of a quasi-Gaussian beam.

The silicon waveguide crossing may exhibit a very low loss over a large bandwidth. This waveguide crossing may be fabricated from a silicon-on-insulator (SOI) wafer, e.g. a 220-nm SOI platform. In some embodiments, the silicon waveguide crossing causes light to propagate in a manner analogous to Gaussian beam one-to-one imaging. This is conceptually illustrated by FIG. 1 which shows on the left a silicon waveguide crossing 100 and on the right an analogous one-to-one imaging produced by parallel spaced-apart lenses 105. The silicon waveguide crossing includes a first silicon waveguide 200 and a second silicon waveguide 300. The quasi-Gaussian beam waist $w_o$ is indicated in FIG. 1 with a solid double-sided arrow. As will be described below in greater detail, the waveguide crossing transforms a single mode beam of light into a multimode beam of light, the modes of which optically interfere to form a converging optical beam that self-images, i.e. replicates itself, across the gap defined by the intersecting second waveguide.

Figure 2:
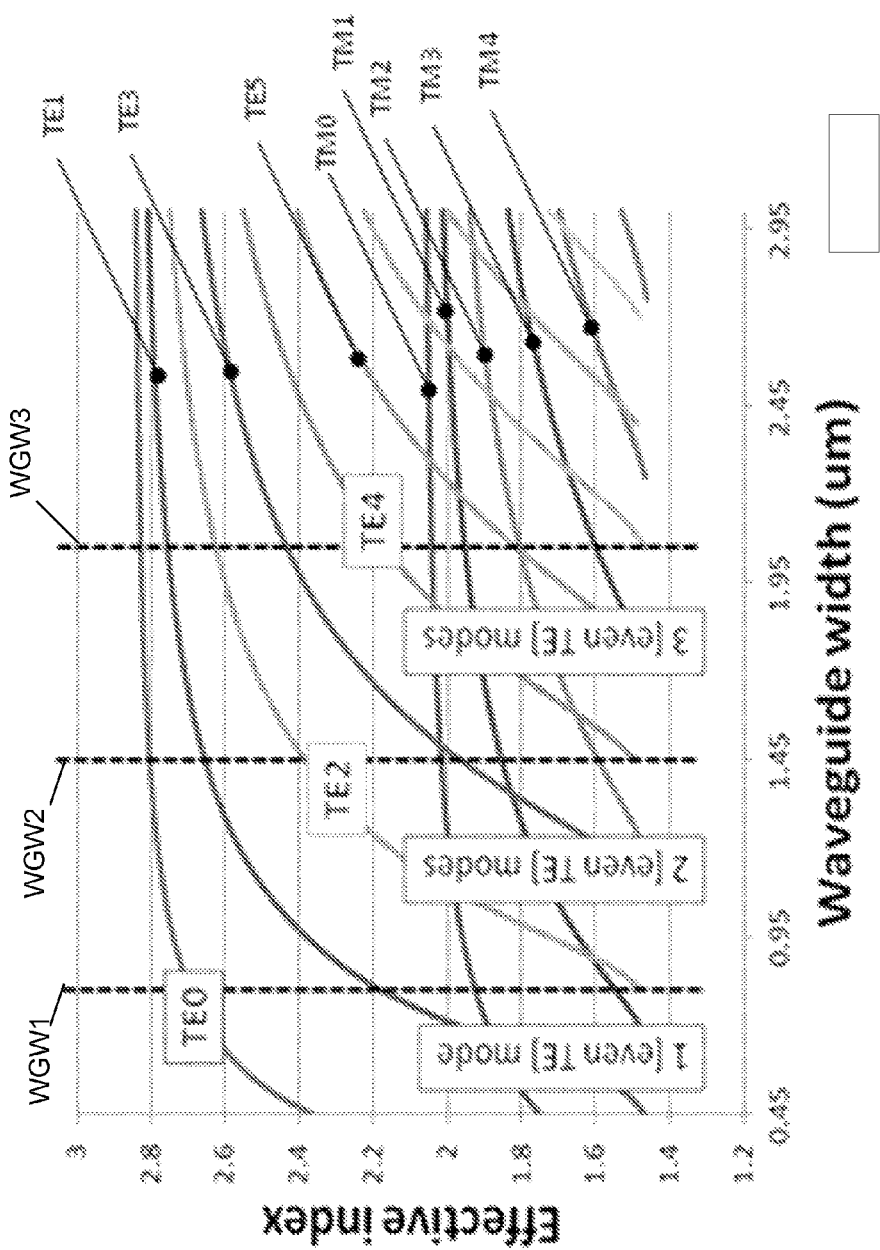
FIG. 2 is a graph of effective index of a silicon waveguide embedded in silica, having 220 nm in thickness, as a function of waveguide width, at a wavelength of 1550 nm.

FIG. 2 is a graph of effective refractive index as a function of waveguide width. As will be described in further detail below, the silicon waveguide crossing is divided into sequential sections that respectively supporting first, second and third even waveguide modes (or "guided modes"). In some embodiments, the first, second and third even waveguide modes are $TE_0$, $TE_2$ and $TE_4$. In other embodiments, the first, second and third even waveguide modes are $TM_0$, $TM_2$ and $TM_4$. As shown in FIG. 2, as the sequential sections of the waveguide are widened, the waveguide is able to support additional modes. As shown in FIG. 2, when the waveguide has a waveguide width (WGW) less than a first waveguide width $WGW_1$, the waveguide can support only a single mode in a given polarization, e.g. the fundamental modes $TE_0$ or $TM_0$. When the waveguide has a waveguide width between the first waveguide width $WGW_1$ and a second waveguide width $WGW_2$, the waveguide can support two modes, e.g. $TE_0$ and $TE_2$, or $TM_0$ and $TM_2$. When the waveguide has a waveguide width (WGW) between the second waveguide width $WGW_2$ and a third waveguide width $WGW_3$, the waveguide can support three modes, e.g. $TE_0$, $TE_2$ and $TE_4$, or $TM_0$, $TM_2$, and $TM_4$.

Figure 3:
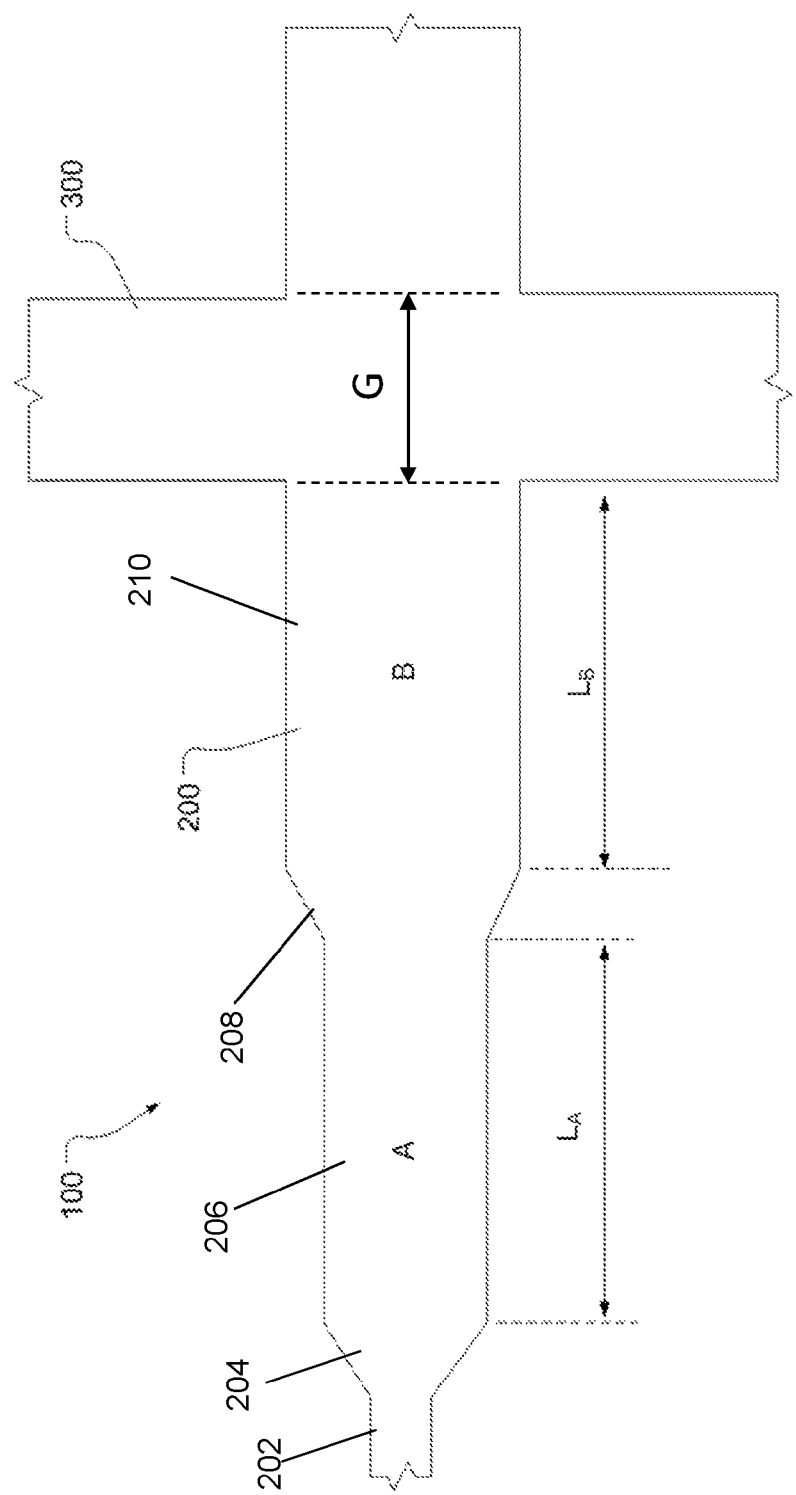
FIG. 3 is a top view of a portion of a silicon waveguide crossing in accordance with some embodiments of the disclosure.

As depicted in FIG. 3, light propagating in a fundamental mode (mode 1) is launched into the input waveguide 202 (of the first waveguide 200). A first taper 204 transmits mode 1 and excites mode 2 (the first even-symmetry higher order mode). A straight section A (also denoted 206) of length $L_A$ adjusts the phase offset between mode 1 and mode 2. A second taper 208 excites mode 3 (the second even-symmetry higher order mode). The second straight section B (also denoted 210) of length $L_B$ adjusts the phase between mode 1, mode 2, and mode 3. The required modal amplitudes and modal phases are thus obtained for an optimal, or near-optimal, overlap to produce a desired converging beam) at the waveguide crossing 100 of the first and second waveguides 200, 300. The quasi-Gaussian beam has a suitably curved approximately spherical phase profile that self-images or self-replicates symmetrically across the gap G. The quasi-Gaussian beam is "synthesized" by the superposition (i.e. interference) of three waveguide modes having the appropriate phase relationships. The synthesized quasi-Gaussian beam self-images across the in-plane waveguide crossing.

In the embodiment illustrated in FIG. 3, the first section supports only a single mode (e.g. $TE_0$). The second section supports two even modes, i.e. the first mode (e.g. $TE_0$) and the second even mode ($TE_2$). The third section supports three even modes, i.e. the first mode (e.g. $TE_0$), the second even mode ($TE_2$) and the third even mode ($TE_4$). Accordingly, the waveguide is composed of different mode-transforming (non-adiabatic) sections. By virtue of its non-adiabatic sections, the waveguide transforms single-mode light into two-mode light and then into three-mode light. A quasi-Gaussian converging beam (or another converging beam) is thus formed, or "synthesized", at the crossing by the overlap/interference of the three even waveguide modes.

Figure 4:
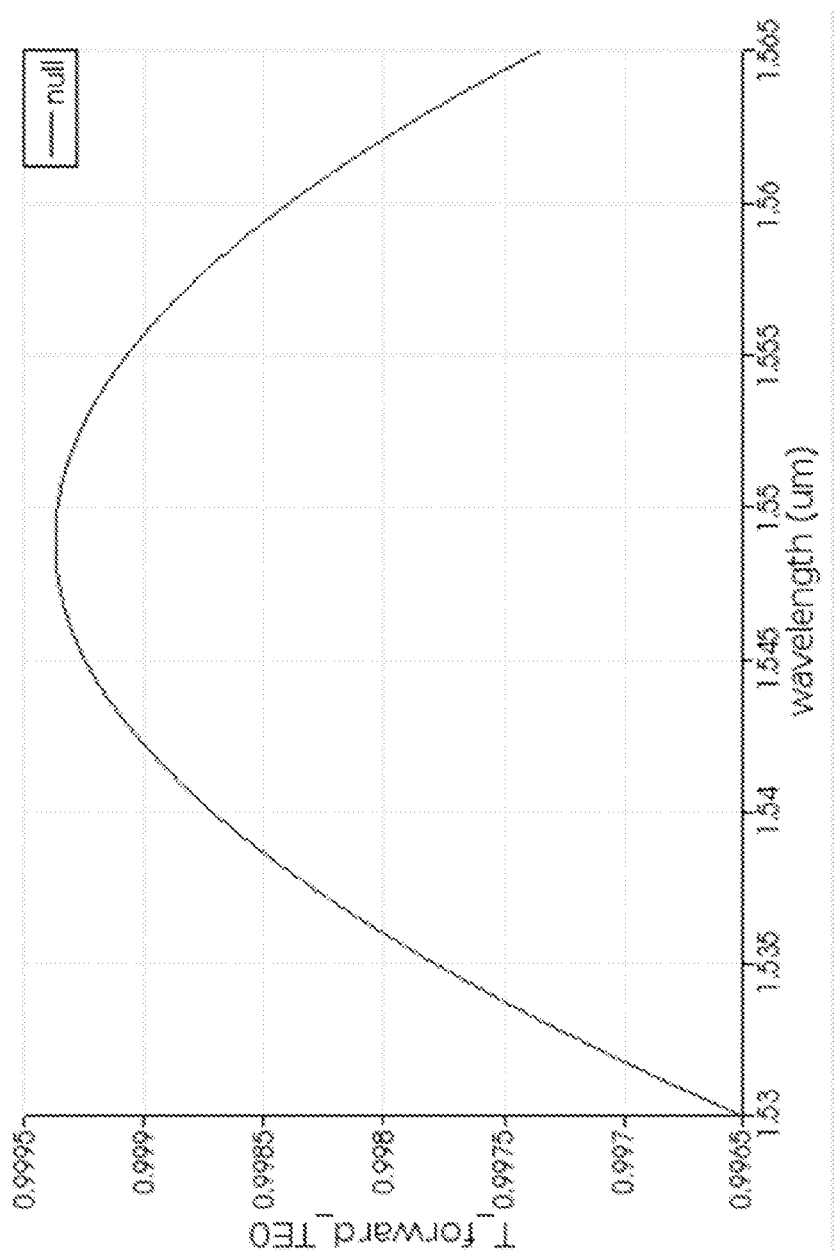
FIG. 4 is a graph showing the fraction of optical power that transits the waveguide crossing as a function of wavelength, for optical power launched and received as the fundamental transverse electric mode $TE_0$ of the input and output waveguide of the crossing.

FIG. 4 is a graph of the proportion of the $TE_0$ component that propagates successfully through the crossing as a function of wavelength in the 1550 nm band. It is observed that at 1.55 microns, the light-transferring efficiency of the crossing is 0.9995, meaning that 99.95% of the light entering the gap from the upstream part of the first waveguide is captured by the downstream part of the first waveguide, in the fundamental mode of the downstream waveguide. This result suggests that the crossing exhibits very low loss.

Figure 5:
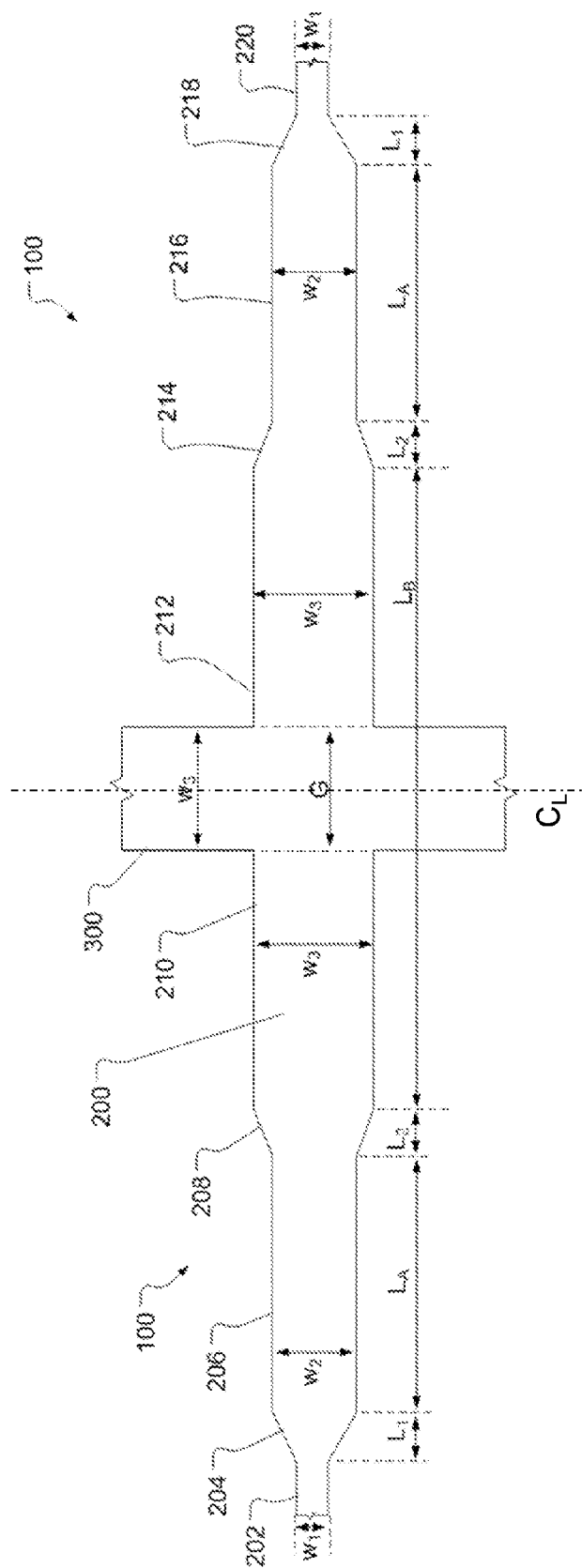
FIG. 5 illustrates a silicon waveguide crossing in accordance with one embodiment.

In the embodiment depicted by way of example in FIG. 5, the silicon waveguide crossing 100 includes the first waveguide 200 and the second waveguide 300 intersecting the first waveguide 100. The first waveguide 200 includes a first waveguide section 202 of width $w_1$ followed immediately by a first diverging non-adiabatic taper 204 of length $L_1$ followed by a second waveguide section 206 of length $L_A$ and width $w_2$ followed by a second diverging non-adiabatic taper 208 of length $L_2$ followed by a third waveguide section 210 of length $L_B$ and width $w_3$. At the crossing is a gap G equal to a width $w_3$ of the second waveguide 300 as shown in FIG. 5. As such, the second waveguide section 206 is wider than the first waveguide section 202 while the third waveguide section 210 is wider than the second waveguide section 206. The first waveguide 200, in the embodiment illustrated in FIG. 5, is symmetrical across a plane of symmetry defined by a centerline $C_L$ of the second waveguide 300. Accordingly, on the output side (downstream side) of the first waveguide 200, there is a fourth waveguide section 212 of width $w_3$ followed by a first converging non-adiabatic taper 214 of length $L_2$, followed by a fifth waveguide section 216 of length $L_A$ and width $w_2$, followed by a second converging non-adiabatic taper 218 of length $L_1$ followed by a sixth section 220 of width $w_1$. As such, the fifth waveguide section 216 is narrower than the fourth waveguide section 212 while the sixth waveguide section 220 is narrower than the fifth waveguide section 216. It is to noted that, in this embodiment, the first, second and third waveguide sections 202, 206, 210 are symmetrical to the sixth, fifth and fourth waveguide sections 212, 216, 220, respectively. In the illustrated embodiment, the first and second diverging non-adiabatic tapers 204, 208 are symmetrical to the second and first converging non-adiabatic tapers 218, 214, respectively. It is to be noted that the sum of the lengths of the third waveguide section 210, the gap G (which is equal to $w_3$) and the fourth waveguide section 212 is denoted $L_B$.

In the embodiment depicted by way of example in FIG. 5, the second waveguide 300 is substantially orthogonal (transverse) to the first waveguide 200. In other embodiments, the first and second waveguides 200, 300 are not orthogonal. The first and second waveguides 200, 300 are co-planar, i.e. disposed in the same plane. The first and second waveguides 200, 300 may be formed from the same silicon layer in a silicon photonic stack. The waveguide crossing 100 is thus an in-plane crossing since the first and second waveguides 200, 300 are co-planar, i.e. they lie in the same plane.

In the embodiment depicted by way of example in FIG. 5, the second waveguide 300 has a width $w_3$, i.e. the first and second waveguides 200, 300 have the same width. In another embodiment, the first and second waveguides 200, 300 have different widths. For the second waveguide 300 to exhibit low loss across the gap, it should have the same or similar geometry as the first waveguide 200.

Tabulated below are parameters (dimensions) for one specific example of a waveguide crossing 100 having the geometry of FIG. 5.

| Parameter | Description | Value (microns) |
|---|---|---|
| $w_1$ | Width of first waveguide section | 0.8 |
| $w_2$ | Width of second waveguide section | 1.25 |
| $w_3$ | Crossing width (or gap G) | 2.0 |
| $L_1$ | Length of first taper | 1.25 |
| $L_2$ | Length of second taper | 2.6 |
| $L_A$ | Length of second waveguide section | 0.9 |
| $L_B$ | Edge-to-edge width of crossing at crossing width | 10.8 |

Figure 6:
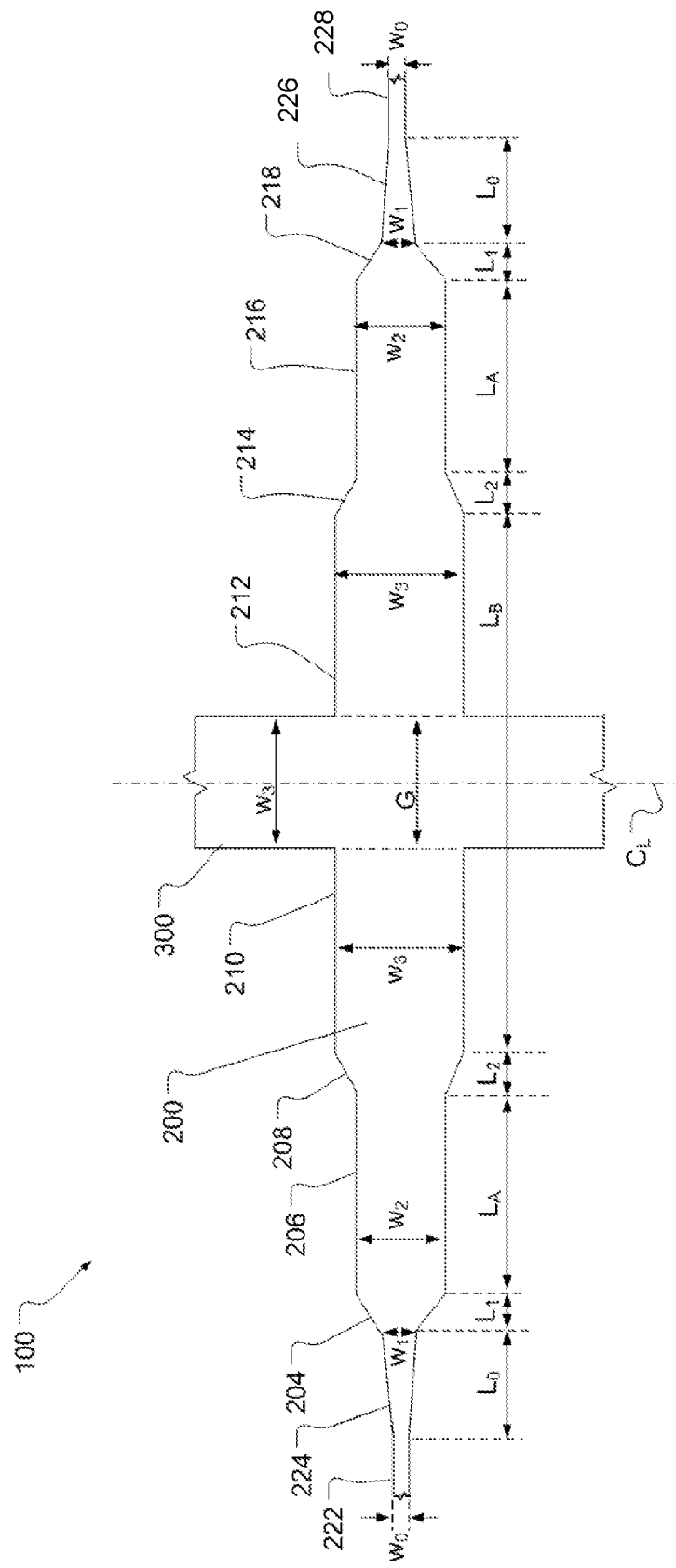
FIG. 6 illustrates a silicon waveguide crossing in accordance with another embodiment.

In an alternate embodiment depicted by way of example in FIG. 6, the silicon waveguide crossing 100 includes a default single mode waveguide section 222 of width $w_0$ followed by an adiabatic diverging taper 224 of length $L_0$ that diverges linearly from the width $w_0$ to the width $w_1$. The default single mode waveguide section 222 and the adiabatic diverging taper 224 may replace the first waveguide section of width $w_1$ which was illustrated in the embodiment of FIG. 5. Following the adiabatic diverging taper 224 of length $L_0$ is the first diverging non-adiabatic taper 204 of length $L_1$. The second waveguide section 206 follows the first diverging non-adiabatic taper 204. Following the second waveguide section 206 is the second diverging non-adiabatic taper 208 and then the third waveguide section 210. In the embodiment shown in FIG. 6, the first waveguide 200 is symmetrical with respect to the plane of symmetry defined by a centerline $C_L$ of the second waveguide 300. Accordingly, the sixth waveguide section 220 of FIG. 5 is replaced by a converging adiabatic taper of length $L_0$ 226 and a default single mode waveguide section 228 of width $w_0$.

Tabulated below are the additional parameters (dimensions) for $w_0$ and $L_0$ for one specific example of a waveguide crossing 100 having the geometry of FIG. 6. The remaining parameters are, in this specific example, identical to the parameters listed above for the example of FIG. 5. These parameters are presented solely as an example. It is to be emphasized that this is strictly an example and that waveguide crossings having other parameters dimensions may function just as well.

| Parameter | Description | Value (microns) |
|---|---|---|
| $w_0$ | default single mode waveguide width | 0.5 |
| $L_0$ | $w_0$-$w_1$ adiabatic taper length | 5.0 |

Figure 7:
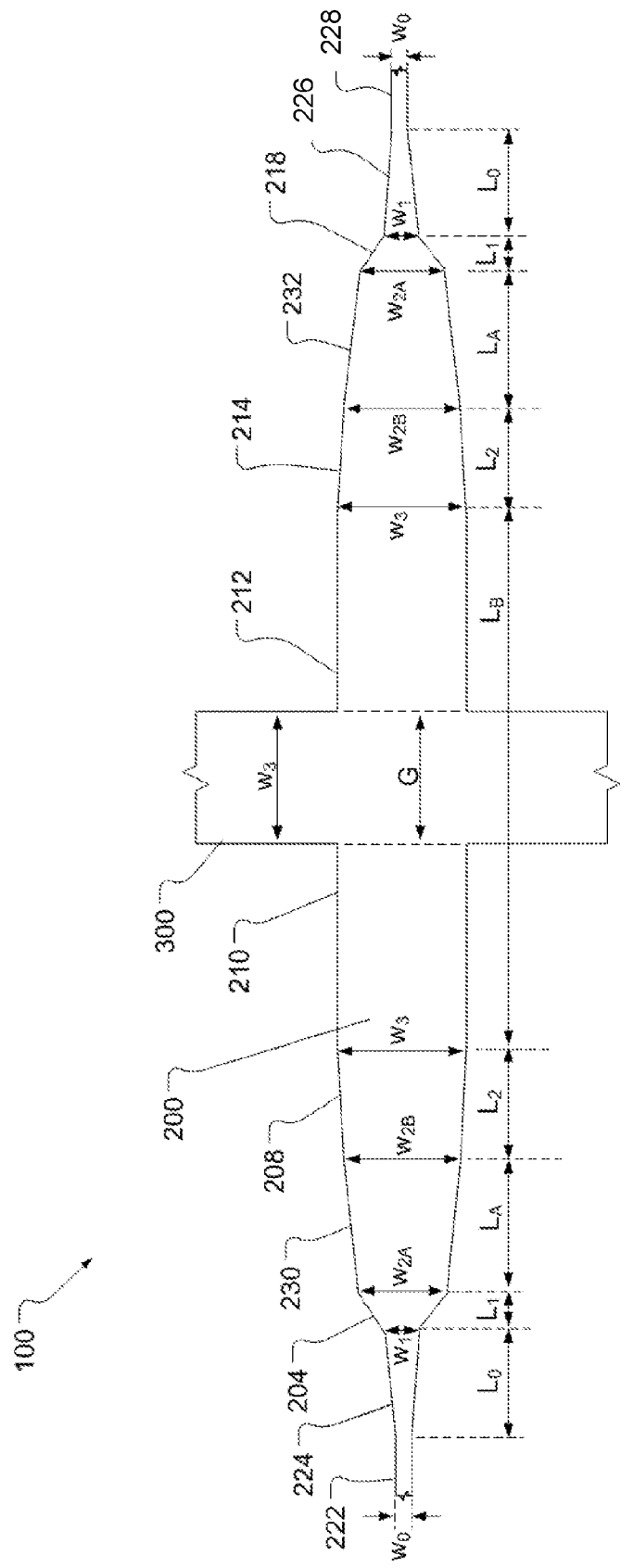
FIG. 7 illustrates a silicon waveguide crossing in accordance with yet another embodiment.

In yet another embodiment, which is depicted by way of example in FIG. 7, the waveguide crossing 100 is formed by the intersection of a differently shaped first waveguide 200 with the second waveguide 300. In the embodiment of FIG. 7, the second waveguide section of width $w_2$ and length $L_A$ is replaced by a second adiabatic taper 230 having start width $w_{2A}$ and end width $w_{2B}$. This second adiabatic taper 230 in this embodiment also has a length $L_A$. Upstream of the crossing this second adiabatic taper 230 is diverging whereas its symmetrical counterpart 232 downstream of the crossing is converging.

As shown in the embodiment of FIG. 7, the first waveguide 200 begins (from an upstream or input perspective) with the default single mode waveguide followed by a first adiabatic taper of length $L_0$ followed by the first taper of length $L_1$ followed in turn by the second adiabatic taper 230 of length $L_A$. The latter is followed by the second non-adiabatic taper 208 of length $L_2$ and then the third waveguide section 210 of width $w_3$.

Figure 8:
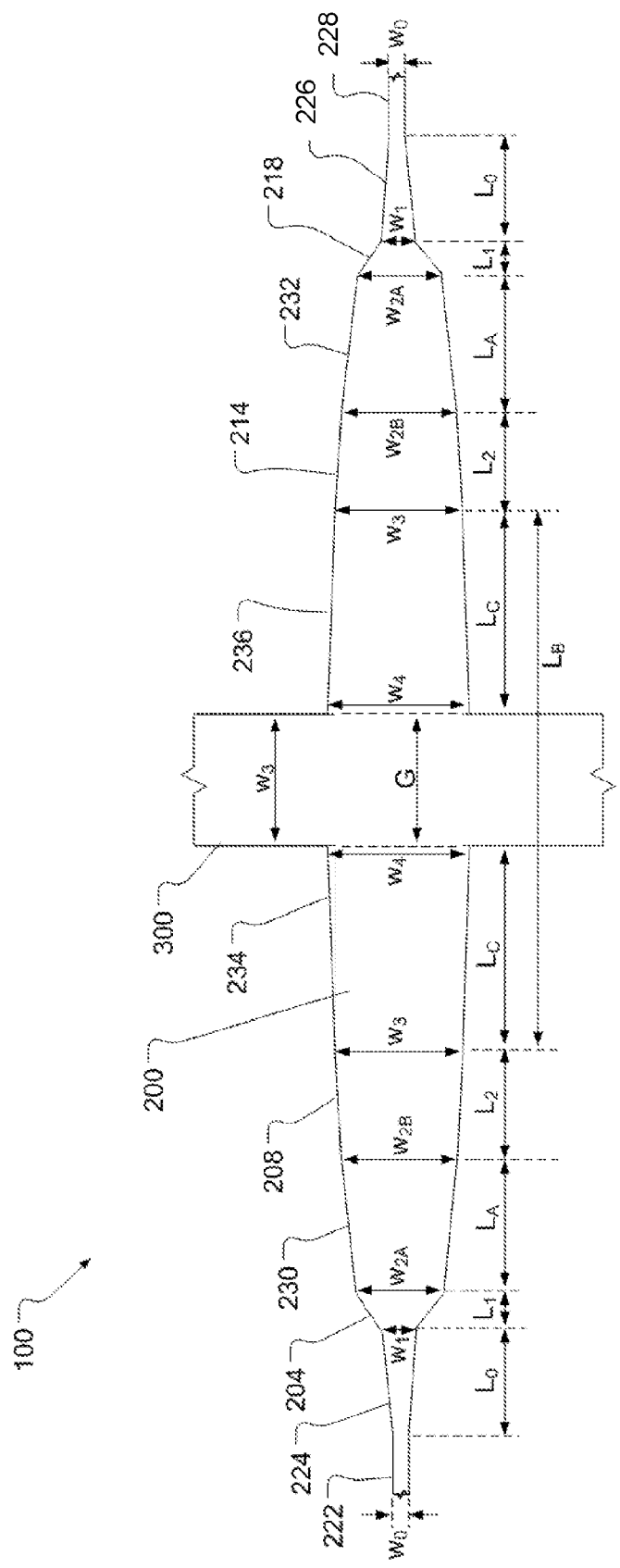
FIG. 8 illustrates a silicon waveguide crossing in accordance with a further embodiment.

In a further embodiment of the waveguide crossing 100, which is shown by way of example in FIG. 8, the first waveguide 200 has a third adiabatic taper 234 of length $L_C$ that converges linearly from a width $w_3$ to a width $w_4$. This third adiabatic taper 234 replaces the third waveguide section 210. The first waveguide 200 is symmetrical about the plane of symmetry defined by the centerline of the second waveguide 300 in this illustrated embodiment. Accordingly, the first waveguide 200 also includes a converging adiabatic taper 236 of length $L_C$ on the downstream side of the gap, i.e. beyond the second waveguide 300. In this embodiment, there are five consecutive tapers, some adiabatic and others non-adiabatic, from the default single mode waveguide section 222 to the second waveguide 300. It is also noted that the length $L_B$ is equal to $2L_C + w_4$.

The second waveguide 300 may also have first, second and third waveguide sections of incrementally increasing widths, analogous to those of the first waveguide 200, such that the second waveguide section of the second waveguide 300 is wider than the first waveguide section of the second waveguide 300 and such that the third waveguide section of the second waveguide 300 is wider than the second waveguide section of the second waveguide 300. The second waveguide 300 may also include a first non-adiabatic diverging taper between the first and second waveguide sections and may also include a second non-adiabatic diverging taper between the second and third waveguide sections. The second waveguide 300 may also include fourth, fifth and sixth waveguide sections as well as first and second converging non-adiabatic tapers which are analogous to their respective counterparts in the first waveguide 200. In some embodiments, the second waveguide 300 is identical to the first waveguide 200.

The waveguide crossing 100 is made of silicon in the illustrated embodiments. However, in another embodiment, the waveguide crossing 100 may be made of silicon nitride (hereinafter denoted "SiN" although it will be appreciated that the SiN may be mainly of the form of $Si_xN_y$, including stoichiometric silicon nitride, $Si_3N_4$). Other light-propagating materials with suitable optical properties can be substituted. Some materials that are believed to function equivalently include certain metal oxides, such as $TiO_2$, $ZrO_2$ and Ta$_2$O$_5$, since they have similar refractive indices to silicon nitride around the wavelengths of 1310 nm and 1550 nm, as well as a high optical transparency at those wavelengths.

The silicon waveguides may be etched, formed or otherwise created from deposited layers of silicon. Silicon, silicon nitride, and silica may be deposited on a SOI wafer using various existing CMOS-compatible fabrication techniques, e.g. chemical vapor deposition (CVD), lithography and etching. Layers may be deposited onto the SOI wafer using front-end-of line (FEOL) processes to form a FEOL layer stack or back-end-of-line (BEOL) processes to form a BEOL layer stack.

From the foregoing, it is now understood that three even-order modes interfere to form (or "synthesize") a converging beam with a predetermined (desired) phase profile at the crossing gap. The before-gap (upstream) geometry has three sections joined by two intermediate tapers. Each waveguide section supports respectively one, two and three even modes, which are either all transverse electric modes (TE$_0$, TE$_2$, TE$_4$) or transverse magnetic modes (TM$_0$, TM$_2$, TM$_4$). The first waveguide 200 in the illustrated embodiments excites only the even modes of a first polarization of interest. The three even-order modes created by the first waveguide 200 synthesize to form a converging optical beam that focuses approximately in the middle of a gap G in the first waveguide 200 defined by a width w$_3$ of the second waveguide 300. Stated otherwise, the three even-order optical modes synthesize at a first interface of the third waveguide section 210 and the gap G to form a synthesized beam profile that is replicated symmetrically at a second interface of the gap G and the fourth waveguide section 212. In the illustrated embodiments, the first waveguide 200 of the waveguide crossing 100 has only three discrete widths to enable propagation of only three even-order optical modes.

The waveguide crossings 100 disclosed herein exhibit lower loss (less than 20 mdB over the 1535-1565 nm range) which is significantly better than the 40+ mdB losses exhibited by previously known technologies. Moreover, the decomposition of the waveguide crossing into discrete structural components or sections having specific independent functions enables simple iterative optimization of the waveguide crossing. Accordingly, the waveguide crossings disclosed herein are simple and intuitive to optimize and manufacture.

Figure 9:
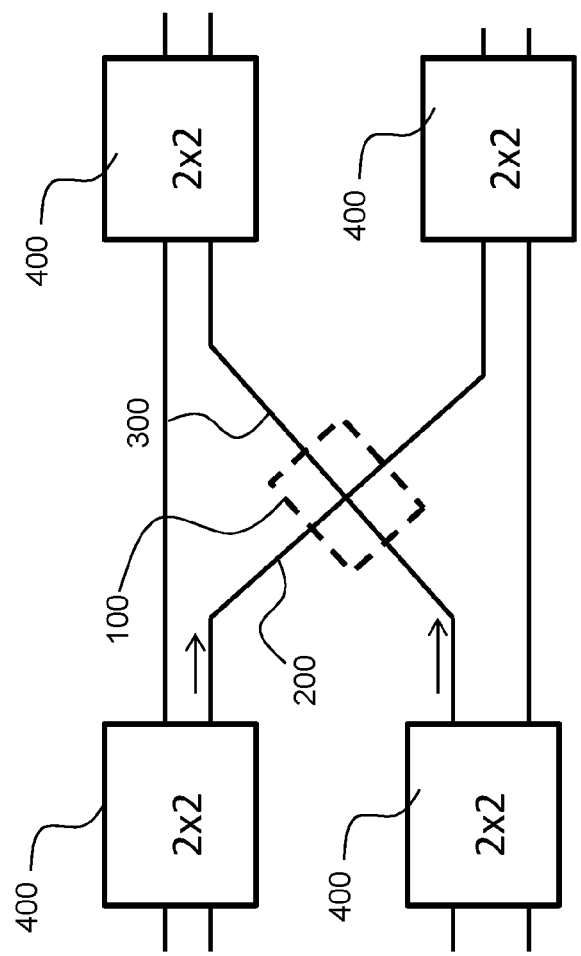
FIG. 9 is a schematic representation of a silicon waveguide crossing in a photonic switch.
Figure 10:
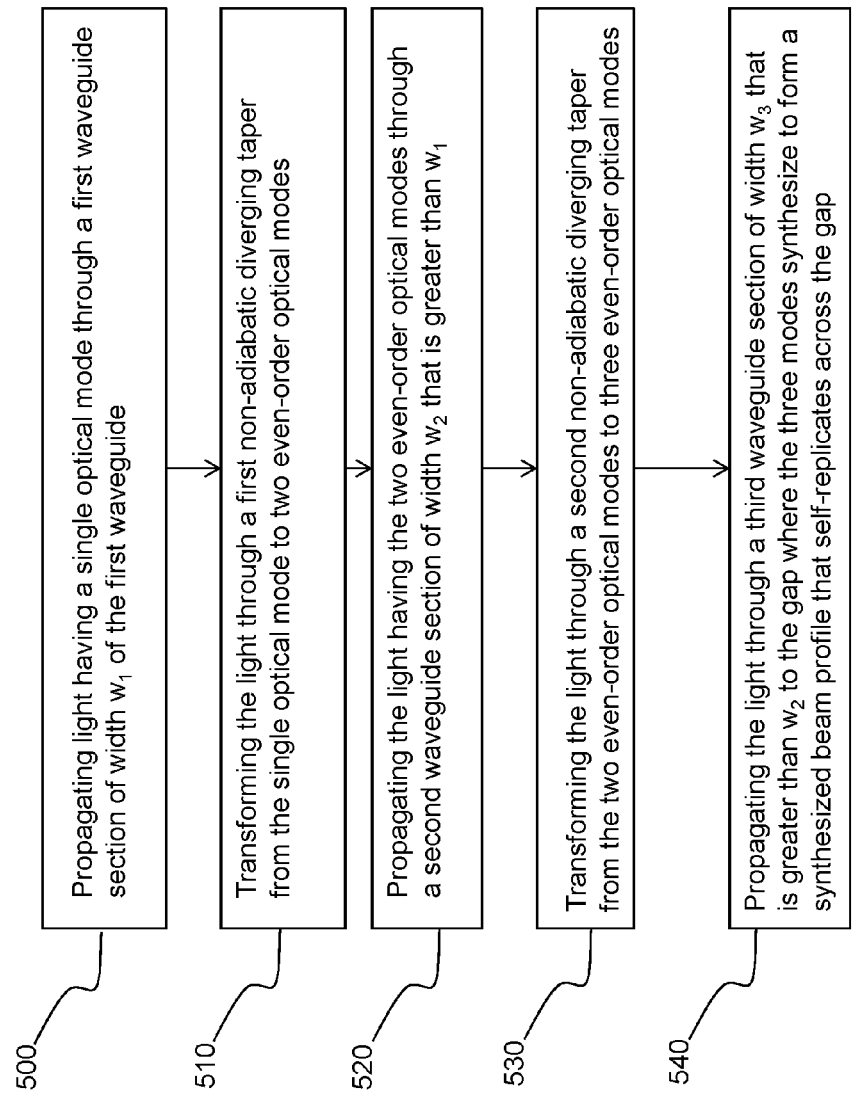
FIG. 10 is a flowchart of a method of propagating light across a silicon waveguide crossing.

A plurality of silicon waveguide crossings 100 may be incorporated into an N×N photonic switch where N>2 to thereby provide a low-loss optical switch. As depicted by way of example in FIG. 9, the waveguide crossing 100 may be connected to a plurality of 2×2 photonic switches 400 to enable light carried by the first waveguide 200 to intersect the second waveguide 300. An optical switch matrix may be fabricated by incorporating a plurality of such waveguide crossings.

Another inventive aspect of this disclosure is a method of propagating light across a waveguide crossing 100, e.g. a silicon waveguide crossing, having a first waveguide 200 intersecting a second waveguide 300 such that a gap G equal to a width of the second waveguide 300 is formed in the first waveguide 200. In some embodiments, the second waveguide 300 has a centerline C$_L$ that defines a plane of symmetry. The method entails propagating (500) light having a single optical mode through a first waveguide section 202 of width w$_1$ of the first waveguide 200, transforming (510) the light through a first non-adiabatic diverging taper 204 from the single optical mode to two even-order optical modes, propagating (520) the light having the two even-order optical modes through a second waveguide section 206 of width w$_2$ that is greater than w$_1$, transforming (530) the light through a second non-adiabatic diverging taper 208 from the two even-order optical modes to three even-order optical modes, and propagating (540) the light through a third waveguide section 210 of width w$_3$ that is greater than w$_2$ to the gap where the three modes synthesize to form a synthesized beam profile that self-replicates across the gap. In other words, the method entails propagating light through the first waveguide section 202, mode-transforming (510) the light through the first non-adiabatic diverging taper 204, propagating (520) the light through the second waveguide section 206 wider than the first waveguide section 202, mode-transforming (530) the light through a second non-adiabatic diverging taper 208, and propagating (540) the light through the third waveguide section 210 that is wider that the second waveguide section 206.

The method may further include propagating the light having the three even-order optical modes through a fourth waveguide section of width w$_3$, transforming the light through a first non-adiabatic converging taper from the three even-order optical modes to two even-order optical modes, propagating the light having the two even-order optical modes through a fifth waveguide section of width w$_2$ that is less than w$_3$, transforming the light through a second non-adiabatic diverging taper from the two even-order optical modes to a single optical mode, and propagating the light through a sixth waveguide section of width w$_1$ that is less than w$_2$.

In one implementation of the method, light is propagated through an adiabatic taper that precedes the first waveguide section and that widens from a single-mode waveguide to the width w$_1$ of the first waveguide section. In another implementation, the method further involves propagating the light through adiabatic tapers that function as the second and third waveguide sections.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A waveguide crossing comprising:
   a first waveguide;
   a second waveguide intersecting the first waveguide such that a gap equal to a width of the second waveguide is formed in the first waveguide;
   wherein the first waveguide comprises a first waveguide section through which a single optical mode propagates, followed by a first non-adiabatic diverging taper, followed by a second waveguide section wider than the first waveguide section, through which two even-order optical modes propagate, followed by a second non-adiabatic diverging taper, followed by a third waveguide section wider than the second waveguide section through which three even-order optical modes propagate; and
   wherein the first waveguide further comprises, downstream of the gap, a fourth waveguide section, followed by a first non-adiabatic converging taper, followed by a fifth waveguide section narrower than the fourth waveguide section, followed by a second non-adiabatic converging taper, followed by a sixth waveguide section narrower than the fifth waveguide section.

2. The waveguide crossing of claim 1 wherein the second waveguide has a centerline defining a plane of symmetry, wherein the fourth and fifth waveguide sections are symmetrical with respect to the plane of symmetry to the third and second waveguide sections, respectively, and wherein the first and second converging non-adiabatic tapers are symmetrical with respect to the plane of symmetry to the second and first diverging non-adiabatic tapers, respectively.

3. The waveguide crossing of claim 1 wherein the first and second non-adiabatic diverging tapers and the second and third waveguide sections are configured so that the three even-order optical modes interfere at a first interface between the third waveguide section and the gap to form a converging optical beam having a beam waist in the gap.

4. The waveguide crossing of claim 1 wherein the second waveguide has a centerline defining a plane of symmetry, and wherein the first and second non-adiabatic diverging tapers and the second and third waveguide sections are configured so that the three even-order modes interfere at a first interface between the third waveguide section and the gap to form a converging quasi-Gaussian beam across the gap, wherein the quasi-Gaussian beam is substantially symmetrical with respect to the plane of symmetry.

5. The waveguide crossing of claim 1 wherein the first to sixth waveguide sections have constant widths.

6. The waveguide crossing of claim 1 wherein the first waveguide section comprises an adiabatic taper that widens towards the first non-adiabatic diverging taper.

7. The waveguide crossing of claim 1 wherein the second waveguide section comprises an adiabatic taper that widens towards the second non-adiabatic diverging taper.

8. The waveguide crossing of claim 1 wherein the third waveguide section comprises an adiabatic taper that widens towards the gap.

9. The waveguide crossing of claim 1 wherein the second waveguide section has a length $L_A$ selected to adjust a phase offset between the two even-order optical modes.

10. The waveguide crossing of claim 1 wherein the third waveguide section has a length $L_B$ selected to adjust a phase offset between the three even-order optical modes.

11. The waveguide crossing of claim 1 wherein the second waveguide comprises a first waveguide section through which a single optical mode propagates, followed by a first non-adiabatic diverging taper, followed by a second waveguide section wider than the first waveguide section, through which two even-order optical modes propagate, followed by a second non-adiabatic diverging taper, followed by a third waveguide section wider than the second waveguide section through which three even-order optical modes propagate; and
   wherein the second waveguide further comprises, downstream of the gap, a fourth waveguide section, followed by a first non-adiabatic converging taper, followed by a fifth waveguide section narrower than the fourth waveguide section, followed by a second non-adiabatic converging taper, followed by a sixth waveguide section narrower than the fifth waveguide section.

12. A method of propagating light across a waveguide crossing having a first waveguide intersecting a second waveguide such that a gap equal to a width of the second waveguide is formed in the first waveguide, the method comprising:
   propagating light having a single optical mode through a first waveguide section of the first waveguide;
   transforming the light through a first non-adiabatic diverging taper from the single optical mode to two even-order optical modes;
   propagating the light having the two even-order optical modes through a second waveguide section wider than the first waveguide section;
   transforming the light through a second non-adiabatic diverging taper from the two even-order optical modes to three even-order optical modes;
   propagating the light through a third waveguide section wider than the second waveguide section to the gap where the three modes interfere to form a beam profile that self-replicates across the gap.

13. The method of claim 12 further comprising:
   propagating the light having the three even-order optical modes through a fourth waveguide section;
   transforming the light through a first non-adiabatic converging taper from the three even-order optical modes to two even-order optical modes;
   propagating the light having the two even-order optical modes through a fifth waveguide section narrower than the fourth waveguide section;
   transforming the light through a second non-adiabatic converging taper from the two even-order optical modes to a single optical mode;
   propagating the light through a sixth waveguide section narrower than the fifth waveguide section.

14. The method of claim 13 further comprising propagating the light through an adiabatic taper in the first waveguide section that widens from a single-mode waveguide to the first waveguide section.

15. The method of claim 14 further comprising propagating the light through adiabatic tapers in the second and third waveguide sections.

* * * * *